Oct. 2, 1962    H. J. BUTLER    3,056,471
BRAKING SYSTEM FOR RAILWAY VEHICLES
Filed Sept. 10, 1957    4 Sheets-Sheet 2
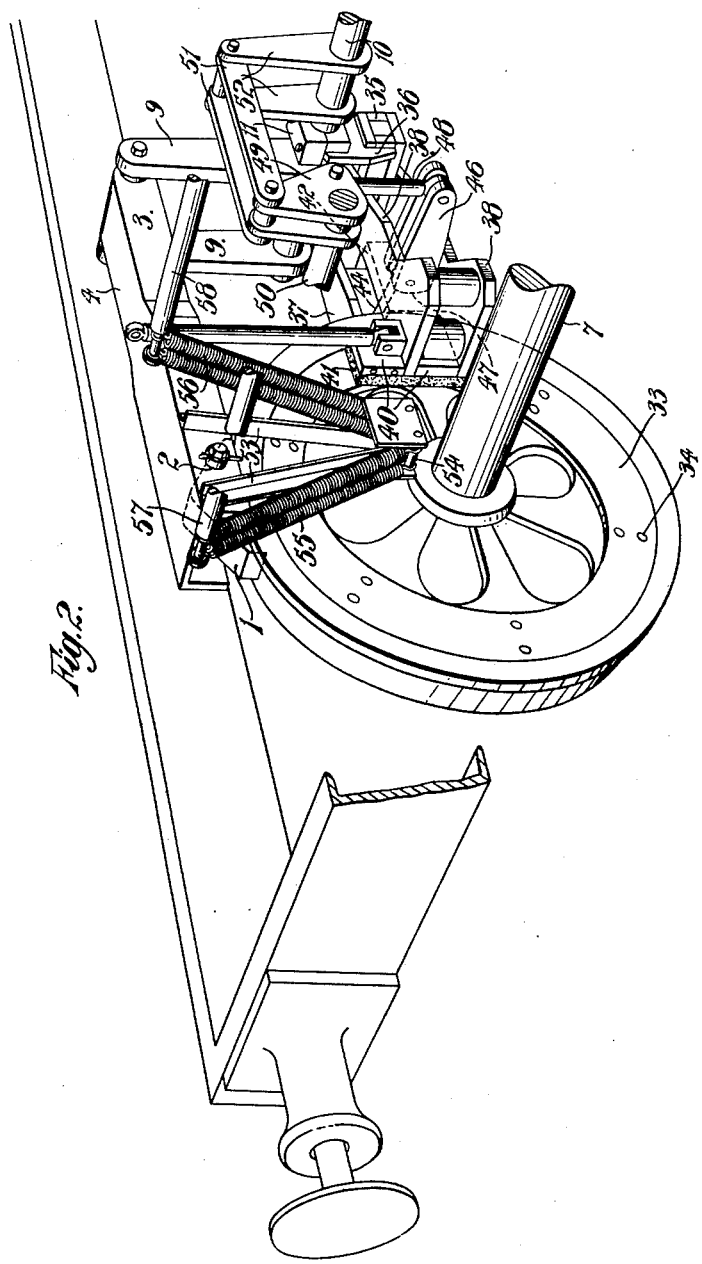
INVENTOR
Henry James Butler
by Benj. T. Rauber
his attorney

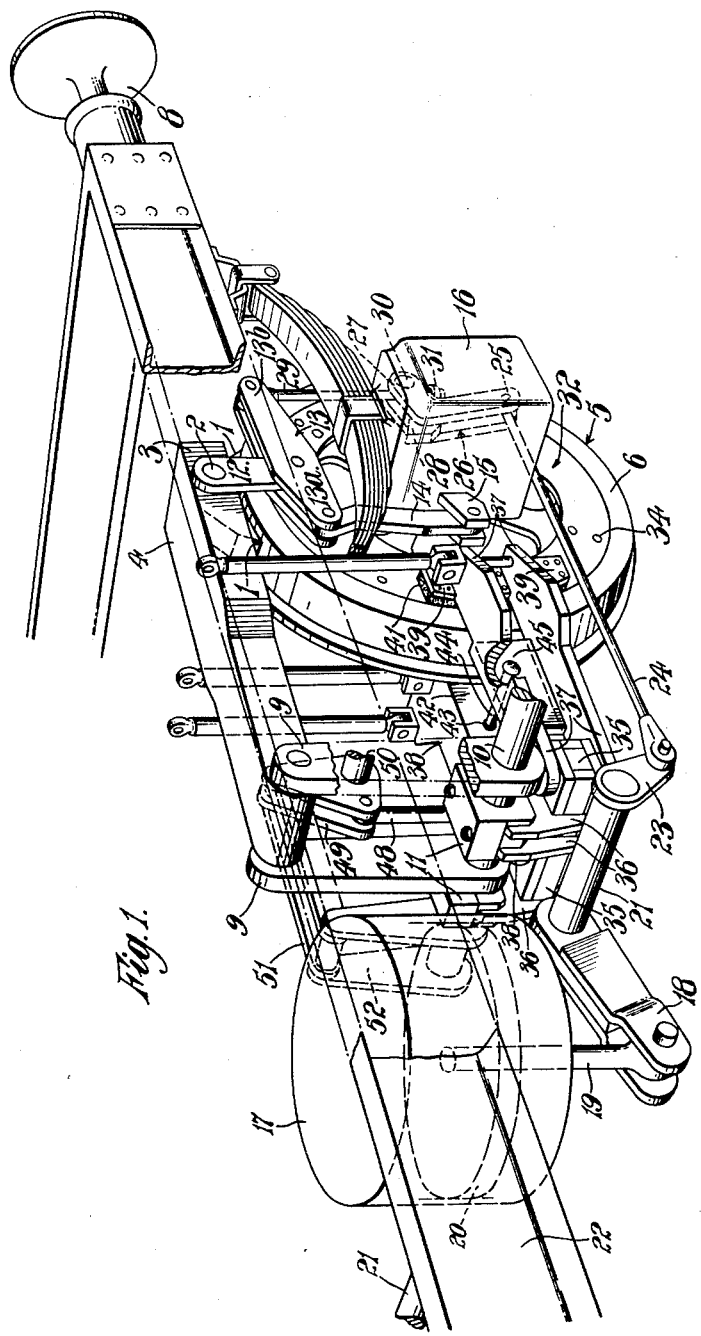

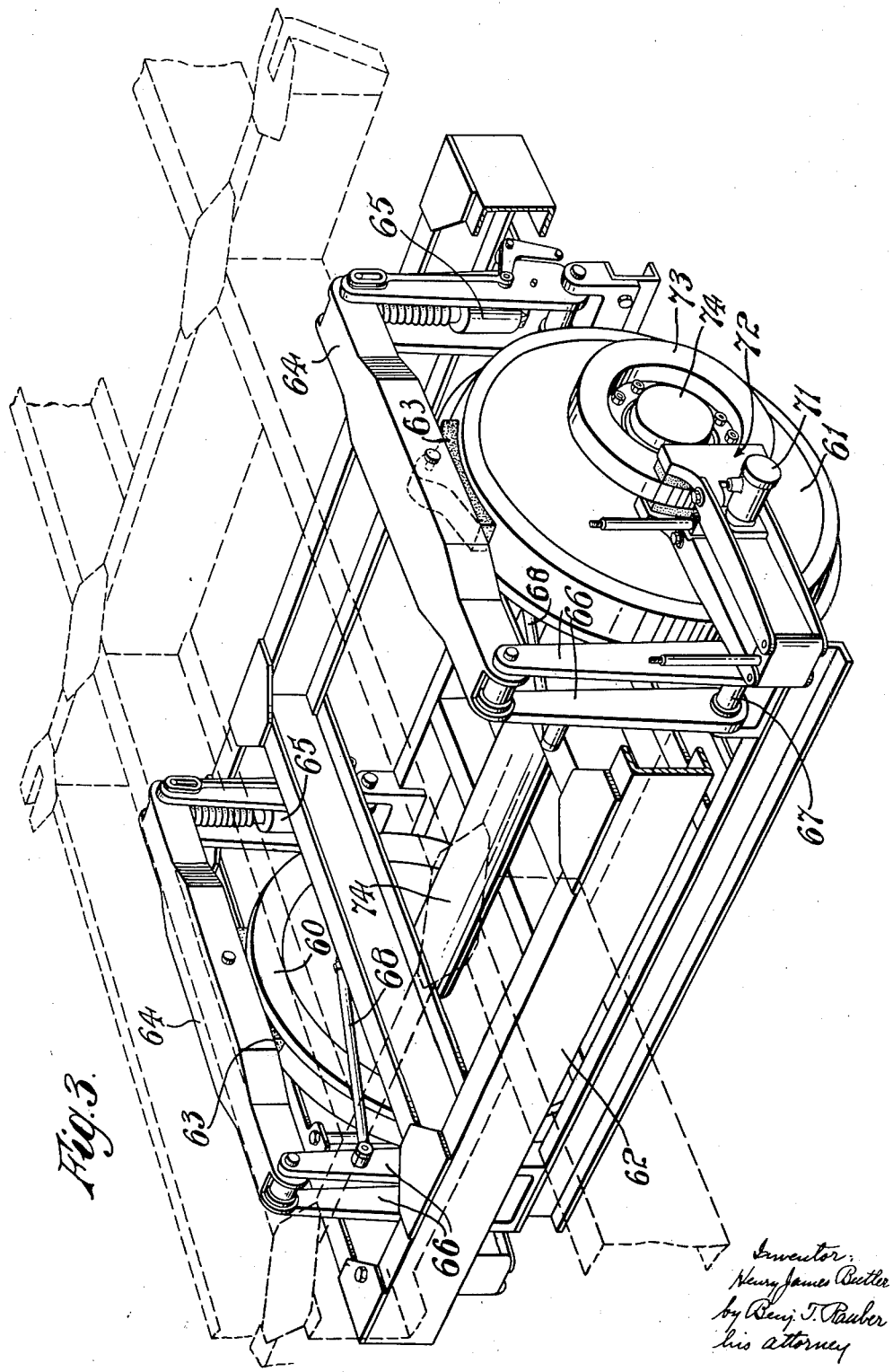

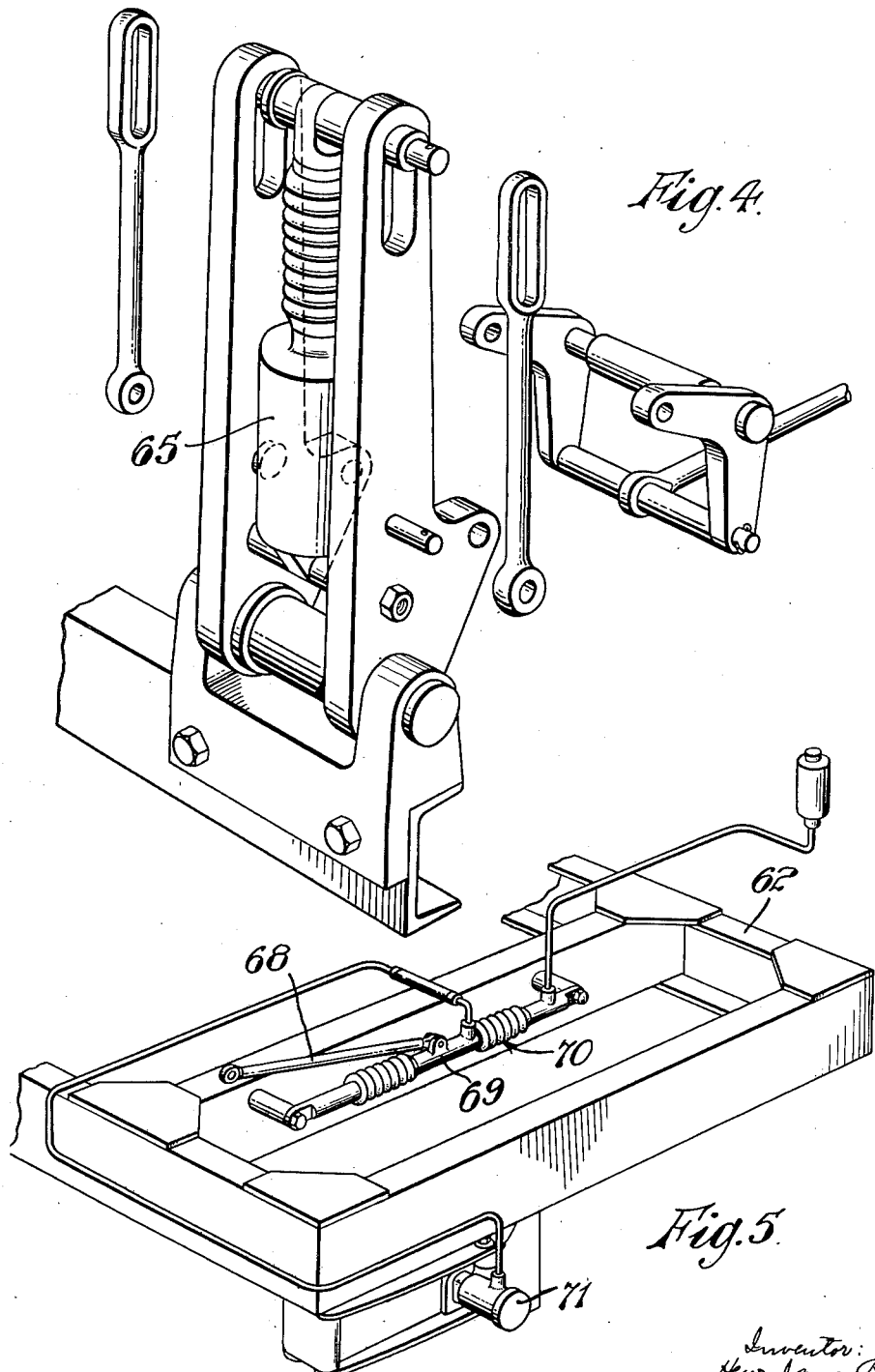

United States Patent Office 3,056,471  
Patented Oct. 2, 1962

3,056,471  
BRAKING SYSTEM FOR RAILWAY VEHICLES  
Henry James Butler, Sutton Coldfield, England, assignor to Dunlop Rubber Company Limited, London, England, a British company  
Filed Sept. 10, 1957, Ser. No. 683,096  
Claims priority, application Great Britain Sept. 11, 1956  
10 Claims. (Cl. 188—33)

This invention relates to an improved system for braking railway vehicles.

Brakes for railway wagons and the like are normally of what is termed the "clasp" type, i.e. they comprise two diametrically-opposed cast-iron brake shoes which are adapted to engage the steel rolling surface of the wheel under the action of a suitable operating mechanism. This type of brake has certain advantages in that the cast-iron shoes engaging with the wheel simulate the frictional characteristics obtaining between the wheel and the rail, thus relating the actual braking to the wheel adhesion during varying climatic and like conditions. Another advantage of the clasp brake is that it maintains the wheels truly circular and eliminates flats caused by skidding and the like.

The disadvantage of a clasp brake is that it is inefficient and that the brake shoes, being made of cast-iron, require frequent renewal.

The object of the present invention is to provide an improved braking system for railway vehicles.

According to the present invention a vehicle braking system comprises a monitor brake shoe adapted to frictionally engage a wheel, means to effect said frictional engagement, means to permit angular movement of said shoe when frictionally engaged with said wheel and means operable by said movement to actuate a main brake.

The term "monitor brake" is used in the specification and claims of this invention in that it senses the condition of the rail and wheel rim and controls or modifies the application of the main brake accordingly. Thus if a condition should arise in which a wheel should have slight or substantially no frictional engagement with a rail due to the presence of grease, ice or other condition, this condition would be present on the wheel rim and the monitor brake would then monitor the main brake to release the main brake or lessen the force of its application to prevent skidding of the wheel and to re-apply the braking force on the main brake when this condition no longer existed and when there was no danger of skidding.

Preferably said main brake comprises a disc-type brake associated with each wheel of said vehicle, although it may alternatively be associated with the live axle connecting each pair of axially-aligned wheels. The brake shoe may be operated by a linkage of rods or like means through a vacuum or pressure-operated mechanism and the degree of braking required may be manually controlled. The brake shoe is mechanically linked to the means for effecting main braking pressure, e.g. the main brake may be operated directly by said linkage, or said linkage may operate a master-cylinder and the like and the main brake may be operated either pneumatically, hydraulically or electrically.

But a better understanding of the invention may be obtained from the following description when this is read with reference to the accompanying drawings, of which:

FIGURE 1 is a perspective view of a braking system according to one form of the invention, the view being taken from the outside, and the system being shown as applied to a railway vehicle, FIGURE 2 is a similar view to FIGURE 1, being taken from the inside of the vehicle, i.e. from between the opposed wheels, and FIGS. 3, 4 and 5 are related diagrammatic sketches of another form of braking system suitable for a rail coach, FIG. 3 being a perspective view of a bogey embodying the invention, the view being taken from above and diagonally of the length of the bogey; FIG. 4 being an exploded perspective of certain elements of the brake, and FIG. 5 being a perspective of the bogey showing the main brake actuating elements.

As illustrated in the drawings, the brake of the present invention comprises a monitor-brake shoe 1 which is pivoted on a shaft 2 which passes horizontally through holes formed in the opposite webs 3 of a floating beam 4 which is disposed directly above a wheel 5 of the vehicle so that the shoe 1 is normally held adjacent the periphery of the rail-contacting portion of the wheel rim 6, perpendicularly above the live axle 7 thereof (FIGURE 2), i.e., at 12 o'clock on the wheel 5. The floating beam 4 extends longitudinally inwardly of the vehicle, i.e., in a direction away from the buffer 8, the shoe 1 being pivoted in one end of the beam and the other end of the beam being pivoted in the upper ends of a pair of vertical parallel-spaced levers 9 the lower ends of which are rigidly secured to a horizontal shaft 10 which is rotatable in bearings 11 secured to a non-rotatable portion of the vehicle. Further reference to the shaft 10, which lies parallel with the axle 7, will be made hereunder. The floating beam 4 is free to move longitudinally of the vehicle in either direction, such movement rocking said levers 9 and rotating said shaft 10 in the appropriate direction. The end of the beam 4 adjacent the shoe 1 is also free to move vertically towards and away from the wheel 5, such movement pivoting the beam between the upper ends of the levers 9 and moving the shoe 1 towards, or away from, the rim 6.

The shaft 2 is extended transversely outwardly of the outer web 3 of the floating beam 4 and on this extension is pivoted the upper end of a depending link 12, the lower end of which is pivoted between an identical pair of members which together comprises a composite swinging lever 13. The link 12 is pivoted to the lever 13 intermediate its ends, the precise location of said pivot being determined by the mechanical advantage desired.

A vertical link 14 is pivoted between the ends 13a of the composite lever 13 remote from the buffer 8, and the lower end of the link 14 is pivoted to a bracket 15 secured to the adjacent side of the axle box 16. The link 14 and bracket 15 thus act as a fixed fulcrum for the composite lever 13, whereby a downward pressure on the end 13b of the lever 13 will cause the lever to pivot about the link 14 and to draw the link 12, shoe 1 and the associated end of the floating beam 4 down towards the periphery of the wheel rim 6.

To permit the shoe 1 to be applied to the rim 6 normal vacuum or pressure means 17 are operatively linked to the end 13b of the composite lever 13. This linkage comprises a bifurcated arm 18, one end of which is pivoted to the lower end of a piston rod 19 secured to the piston 20 of the vacuum or pressure cylinder 17. The other end of the arm 18 is secured to a shaft 21 rotatably secured to, and extending transversely of, the side members 22 of the vehicle frame or chassis. On the outer end of the rod 21 is secured a further arm 23 at the free end of which is pivoted an operating rod 24 which extends, substantially parallelly with the side member 22, beneath the axle box 16, and is pivotally secured to one arm 25 of a bell crank lever 26 which is pivoted intermediate its arms 25 and 27 to a bracket 28 secured to the axle box 16 on the opposite side to the bracket 15. A vertical rod 29 is pivotally secured at one end to the arm 27 of the bell crank lever 26 and at the other end to the end 13b of the composite lever 13.

Operation of the vacuum or pressure device 17 as by admission of atmospheric pressure or positively compressed fluid, as the case may be, to the underside of the piston 20 will force the piston upwards in its cylinder and, through the arm 18, will rotate the shaft 21 in a clockwise direction so that the arm 23 exerts a pull on the operating rod 24, rotating the bell crank 26 about its central pivot. The vertical rod 29 will then pull down the free end of the composite lever 13 and, its other end being restrained against movement by the fulcrum arm 14 and bracket 15, this movement of the composite lever 13, through the link 12, will draw the shoe 1 into contact with the rim 6 of the wheel, the adjacent end of the floating beam 4 moving with the shoe 1.

If the wheel 5 is rotating, the frictional engagement between the shoe 1 and the rim 6 will cause the shoe 1 to move angularly with the upper periphery of the wheel, i.e., in the direction of travel of the vehicle, and due to the connection of the shoe 1 and floating beam 4 through the pivot rod 2, this angular movement of the shoe will be translated into a longitudinal movement of the beam 4 in the direction of travel. Longitudinal movement of the beam 4 will move the parallel levers 9 angularly in the same direction as the shoe 1, and movement of the levers 9 will rotate the shaft 10 in the same direction to apply the main brake, as will shortly be described.

Wear will obviously occur in the shoe 1 as the brake receives continuous use, and means are accordingly provided whereby this wear may be taken-up by adjustment so that the amount of free travel of the operating mechanism before the shoe is applied may be kept within the desired limits. To permit this adjustment to be made, the lower end of the rod 29 is screw-threaded and is passed loosely through a hole in the pivot pin 30 in the arm 27 of the bell crank 26. A nut and locknut 31, or the like, is screwed on the bottom of the rod 29 below the pivot 30 and is readily adjustable to take up wear in the shoe 1.

The main brake comprises a disc brake of the pincer type having friction means to engage opposite radial surfaces of the wheel 5.

Whilst the discs may comprise integral portions of the wheel it is preferred that they should be removably attached thereto. Accordingly two annular discs 32, 33 (FIGURE 2) are secured, as by countersunk screws 34, to the opposite radial surfaces of the wheel, the outer periphery of each disc lying within the inner periphery of the rim 6 of the wheel.

Pivoted on blocks 35 secured to a non-rotatable portion 36, to which the bearings 11 are also secured, are two pairs of pincer arms 37, 38, one pair on each radial side of said wheel 5, horizontally disposed and extending radially inwardly adjacent the surfaces of said wheel to a point substantially coinciding with the inner peripheries of said discs 32, 33. The pincer arms 37, 38 are preferably of channel section with the limbs of said channel directed axially outwardly of the plane of rotation of the wheel, and the web of said channel being removed adjacent their pivoted ends to form a bifurcation to straddle the blocks 35. The arms 37, 38 are arranged to pivot in a plane normal to the plane of rotation of the discs 32, 33.

At the free end of each pair of arms 37, 38 and on the side thereof adjacent the associated disc 32 or 33, are secured pressure plates 39, 40 which are disposed parallel to the radial surface of each disc, and to these pressure plates are secured pads 41 of friction material in such a manner that upon the pincer arms 37, 38 being moved together, as will later be described, the pads 41 of friction material are adapted to be forced into frictional contact with the discs 32, 33.

Through the web 42 of the pincer arm 38, intermediate its pivot and its pressure plate 40, and clear of the rim 6 of the wheel, a hole 43 is formed and through this hole 43 is passed an eye-bolt 44 which is secured in the web 45 of the pincer arm 37. The other end of the eye-bolt 44 is located between the parallelly-spaced plates of a cam member 46 having formed thereon, at its inner end, double-acting cam surfaces 47 so that rotation of said cam member 46 vertically in either direction is adapted to cause one or other of said cam surfaces 47 to engage the inner surface of the web 42 of the pincer arm 38, whereby the reaction of the cam surface 47 and the eye-bolt 44 causes the pincer arms 37, 38 to be drawn together and the pads 41 of friction material to be forced against the discs 32, 33.

The cam member 46 is operatively associated with the floating beam 4 by a linkage which comprises a vertical rod 48 pivoted between two ears at the free end of the cam member and extending upwardly between two parallelly-disposed triangular plates which in association comprise a bell-crank-like member 49. The rod 48 is pivoted at what is virtually the free end of the shorter arm of this bell-crank-like member 49. The member 49 is pivoted intermediate its "arms" on a shaft 50 which is secured to a non-rotatable part of the vehicle, and its upper end, corresponding with its "long arm" is pivoted to a pair of links 51 which are in turn pivoted to a pair of vertical arms 52 secured to the shaft 10 in axial and radial alignment with the arms 9 and movable in unison therewith.

To return the shoe 1 to its central disengaged position when not in operation, and similarly to disengage the main brake, a pair of arms 53 FIG. 2 is secured to the inner web 3 of the floating beam 4 symmetrically one on each side of the pivot rod 2 and converging downwardly towards the axle 7 but stopping short thereof. To two suitable rods or pegs 54 secured to the lower ends of these arms 53 are secured four tension springs which are extended diagonally-upwardly in two pairs 55, 56 and are looped on the ends of horizontal rods 57, 58 which are secured to the body of the vehicle.

In the inoperative condition of the brake the opposed springs 55 and 56 exert a balanced pull on the floating beam 4 radially-outwardly on both sides of the 12 o'clock or top central, position. On application of the brake in either direction of wheel rotation, the longitudinal movement of the beam reduces the tension in the pair of springs in the direction of movement and increases the tension in the other pair of springs. Thus immediately the operating pressure is removed from the shoe 1 the more-highly tensioned springs will draw the beam back to its central position and the shoe will be raised clear of the rim. At the same time the main brake will be released.

When it is desired to apply the present brake, with the vehicle moving in either direction, the vacuum or pressure device is operated in the normal manner. This causes the monitor-brake shoe 1 to be applied to the wheel rim 6, as previously described, and the floating beam 4 to be moved longitudinally to rock the arms 9 and spindle 10.

Assuming the vehicle to be travelling to the right in FIGURE 1 (left in FIGURE 2) the wheel 5 will be rotating in a clockwise direction (FIGURE 1) and contact of the monitor-brake shoe 1 with the rim 6 will move the floating beam 4 to the right and will rock the arms 9, shaft 10 and arms 52 (FIGURE 2, orientated as in FIGURE 1) in a clockwise direction to cause rod 51 to push the member 49 clockwise about its pivot. This will press the rod 48 downwards to cause the lower portion of the cam surface 47 to press the pincer arm 38 and associated pad 41 against the disc 33. Reaction on the rod 44 will draw the pincer arm 37 and friction pad 41 against the disc 32.

Upon release of the actuator 17, the springs 56, which have been placed under the greatest tension, will draw the beam 4 and shoe 1 to their central position and reverse movement of the arms 9 and 52 will centralise the cam member 46 to its neutral position. Means positively to draw the friction pads 41 clear of the disc are not essential, as it is known that a constant light rubbing contact between the disc and the friction material is not disadvantageous or detrimental, and may even be of some benefit in dusty, wet or muddy conditions.

However, where positive retraction of the main brake is desired this can readily be provided by the insertion of a suitable compression spring on the eye-bolt 44 between the pincer arms 37, 38.

If the vehicle is travelling towards the left as in FIGURE 1 the shoe 1, beam 4, and all links and levers are moved in the opposite direction from that described hereabove, the cam-member 46, in this case, being raised so that the upper portion of the cam surface 47 draws the arms 37, 38 together. In this case the springs 55 are the ones under the greatest tension and they operate to centralise the brakes upon release of the operating pressure.

It is customary, in railway braking systems and the like, to so arrange the parts that, in dry conditions, the braking torque, when the brake is fully applied through a driver's control, is never sufficient to cause a skidding condition of the wheels. However if a wheel, when braked under such conditions, passes over, say, a greasy rail junction or the like, the frictional co-efficient between the rail and wheel will suddenly drop, and the wheel is liable to skid. In the present system, however, the grease on the rail is carried by the rotating wheel into contact with the monitor shoe so that the frictional coefficient between the rail and the shoe also drops, with the result that the springs tend to move the shoe towards its central, inoperative position, thereby substantially proportionately decreasing the torque exerted by the main brake, and averting the skidding condition.

It is not essential that the discs 32, 33 should be secured to the wheel, and they may quite readily be applied to a live axle intermediate a pair of wheels. In such a case the monitor brake-shoe would still be arranged to operate upon the rim of one of the wheels and would be connected with the main brake by an extended linkage in a manner which would be quite clear to the skilled craftsman in the art.

Although the specific form of the invention has been described as a rail vehicle brake it should be clearly apparent that the invention per se is readily applicable to other vehicles such, for instance, as road vehicles converted for use upon metal rails and, in particular, that known class of vehicle adapted to be used alternatively upon rails or road, or like, surfaces. Where, as in many instances, the alternative road and rail wheels are integral or disposed side-by-side so as to be rotatable together the present brake may be used as the sole brake and the conventional road brakes may be eliminated.

The monitor brake shoe is preferably made from metal so that the frictional co-efficient between it and the wheel is as close as possible to the frictional co-efficient between the wheel and the rail, both of which are normally made of steel. Since it is inadvisable to have two similar metals in rubbing frictional engagement the monitor shoe is preferably made from cast-iron. This is also a cheap and quite durable metal. However, the invention is not restricted to metallic brake shoes; for example, they may be made of a ceramic material.

The invention is not restricted to a system whereby the main brake is applied mechanically and FIGURES 3, 4 and 5 show somewhat diagrammatically a braking system for a rail coach comprising a pair of metal-shod wheels 60, 61 located in a flexibly-mounted bogey 62. A monitor brake-block 63 is pivotally secured intermediate the ends of a lever arm 64 extending longitudinally of the bogey and is adapted to frictionally engage the periphery of the wheel at 12 o'clock position. A cylinder 65, connected through a driver's control with a source of pneumatic pressure, is pivotally secured to the bogey and a plunger slidable in said cylinder is pivotally connected to one end of the lever arm.

The other end of the lever arm is pivotally secured to one end of a linkage 66, the other end of which is secured to a shaft 67 rotatable in bearings in the bogey frame and extending normal to the plane of the wheel. Also secured to said shaft, and aligned with the linkage 66, is an arm 68, to the outer end of which is pivotally secured an operating rod 69 FIG. 5 for a double-acting hydraulic master cylinder 70 which is secured to a longitudinally-extending member of the bogey frame. The master-cylinder is operatively connected to the hydraulic brake-operating piston and cylinder mechanism 71 which is adapted to operate a pincer-type brake 72 co-operating with a brake disc 73 which is mounted on an extension of the wheel axle 74 outboard of the wheel. The master-cylinder is illustrated diagrammatically only and the various hydraulic and pneumatic connections are not shown.

The operation of this system is similar to that previously described. To apply his brake the coach driver applies his control to operate the pneumatic piston and cylinder mechanism 65 and this pivots the lever arm 64 about the end of the linkage to force the monitor block 63 against the wheel rim in frictional engagement. On frictional engagement taking place the rotating wheel tends to move the block in the direction of rotation and, depending on the degree of brake application and the co-efficient of friction existing between the block and the wheel rim, the block, together with the lever arm, will be moved in one longitudinal direction or the other, depending on the direction of movement of the coach. This in turn will angularly move the linkage 66 to rotate the shaft 67 and angularly move arm 68. Angular movement of arm 68 will operate the master-cylinder to operate the disc brake.

Having now described my invention, what I claim is:

1. A braking system for a rail vehicle having wheels with metal rims comprising a metallic monitor brake shoe to frictionally engage the rail contacting periphery of a wheel rim, a mechanism to move said shoe into frictional engagement with said rim, means to support said shoe with a limited movement in the direction of rotation of said rim under the frictional thrust of said rim on said shoe, a disc brake comprising a brake disc rotatable in fixed relation with said wheel, friction pads to engage opposite faces of said disc and means to move said friction pads into frictional engagement with the faces of said disk, said means being connected to be actuated by the supporting means of said monitor shoe under the frictional thrust of said rim on said shoe.

2. A braking system according to claim 1 wherein said mechanism to move said brake shoe comprises an arm located adjacent the wheel and co-planar therewith, said arm being angularly movable in the plane of the wheel, to force said shoe against the wheel rim in frictional engagement.

3. A braking system according to claim 2 wherein said arm is also supported to move tangentially to said wheel and wherein said frictional engagement causes the arm to move in one tangential direction or the other, depending on the direction of rotation of said wheel, to thereby operate the disc brake.

4. A braking system according to claim 2 wherein the arm is provided, adjacent the monitor shoe, with a member extending vertically downwardly adjacent one face of the wheel and a pair of return springs each have an inner end secured to said member and extend radially outwardly therefrom to form a V, the outer ends of said springs being secured to the vehicle frame and the arrangement being such that, after removal of braking pressure through the operator's control, the springs move the monitor shoe out of contact with the wheel rim and also centralize the arm to remove main braking pressure.

5. A braking system according to claim 1 wherein the brake disc forms part of the vehicle wheel.

6. A braking system according to claim 1 wherein the disc brake comprises a pair of non-rotatable arms axially-aligned one on each side of the disc and pivotally secured to a part of the vehicle to move angularly in a plane normal to the disc, pads of friction material secured to the ends of said arms to frictionally engage the braking surfaces of a disc and means to force said arms together to effect said frictional engagement.

7. A braking system according to claim 1 wherein the means to effect frictional engagement between the monitor shoe and the wheel rim comprises a mechanical transmission means and a fluid-pressure mechanism actuating said transmission selectively under the control of an operator.

8. A braking system according to claim 3 which comprises a linkage between said arm and said disc brake to transmit said tangential movement of the arm to operate said brake.

9. A braking system according to claim 3 which comprises a double acting master cylinder connected to said arm to be operated in opposite direction by said tangential movement of said arm and to actuate said disc brake.

10. A braking system according to claim 1 which comprises resilient means connected to said monitor brake shoe to bias said brake shoe out of contact with said wheel.

References Cited in the file of this patent

UNITED STATES PATENTS

| | | |
|---|---|---|
| 2,057,422 | Dickson | Oct. 13, 1936 |
| 2,177,954 | Stewart | Oct. 31, 1939 |
| 2,246,213 | Logan | June 17, 1941 |
| 2,344,933 | Lambert | Mar. 21, 1944 |
| 2,419,113 | Bricker | Apr. 15, 1947 |
| 2,751,046 | Tack | June 19, 1956 |
| 2,796,151 | Bachman et al. | June 18, 1957 |
| 2,840,190 | Polanin et al. | June 24, 1958 |
| 2,940,544 | Butler | June 14, 1960 |
| 2,940,547 | Butler | June 14, 1960 |

FOREIGN PATENTS

| | | |
|---|---|---|
| 201,610 | Australia | Apr. 6, 1956 |